United States Patent
Stewart (10) Patent No.: US 10,141,552 B2
(45) Date of Patent: Nov. 27, 2018

(54) PROTECTION SYSTEM FOR A BATTERY DURING RECOIL OF A SHOOTING DEVICE

(71) Applicant: David A. Stewart, Boca Raton, FL (US)

(72) Inventor: David A. Stewart, Boca Raton, FL (US)

(*) Notice: Subject to any disclaimer, the term of this patent is extended or adjusted under 35 U.S.C. 154(b) by 0 days.

(21) Appl. No.: 15/367,860

(22) Filed: Dec. 2, 2016

(65) Prior Publication Data
US 2017/0331087 A1  Nov. 16, 2017

Related U.S. Application Data

(60) Provisional application No. 62/262,661, filed on Dec. 3, 2015.

(51) Int. Cl.
| | |
|---|---|
| *H01M 2/10* | (2006.01) |
| *G03B 17/02* | (2006.01) |
| *G03B 29/00* | (2006.01) |
| *H01M 10/0525* | (2010.01) |
| *F41C 27/00* | (2006.01) |

(52) U.S. Cl.
CPC .......... *H01M 2/1094* (2013.01); *G03B 17/02* (2013.01); *G03B 29/00* (2013.01); *F41C 27/00* (2013.01); *G03B 2217/007* (2013.01); *H01M 2/1066* (2013.01); *H01M 10/0525* (2013.01); *H01M 2220/30* (2013.01)

(58) Field of Classification Search
CPC ........................ H01M 2/1094; H01M 10/0525; G03B 17/02; G03B 2217/007; F41C 27/00

USPC .......................................................... 396/301
See application file for complete search history.

(56) References Cited

U.S. PATENT DOCUMENTS

| | | | | |
|---|---|---|---|---|
| 7,735,255 | B1* | 6/2010 | Kincaid | F41C 33/0254 362/110 |
| 8,557,424 | B2* | 10/2013 | Sato | H01M 2/0267 429/100 |
| 2004/0198336 | A1* | 10/2004 | Jancic | F41G 1/35 455/420 |
| 2009/0252486 | A1* | 10/2009 | Ross, Jr. | G03B 17/02 396/419 |
| 2010/0313461 | A1* | 12/2010 | Holmberg | F41C 27/00 42/90 |
| 2012/0167436 | A1* | 7/2012 | Westra | F41G 11/004 42/90 |
| 2014/0182186 | A1* | 7/2014 | Stewart | F41G 11/002 42/114 |
| 2015/0318526 | A1* | 11/2015 | Mune | H01M 2/043 429/56 |

* cited by examiner

*Primary Examiner* — Clayton E. LaBalle
*Assistant Examiner* — Linda B Smith
(74) *Attorney, Agent, or Firm* — Fleit Gibbons Gutman Bongini Bianco PL; Jon A. Gibbons (57) ABSTRACT

This invention relates to the protection system for battery current collectors in cameras mounted on a gun, bow, or shooting device. More particularly, the present invention relates to the system of protecting the current collectors from fracture in a camera attached to a gun barrel or shooting device as a result of recoil and shock and vibration during shooting device discharge.

18 Claims, 8 Drawing Sheets

PROTECTION SYSTEM FOR A BATTERY DURING RECOIL OF A SHOOTING DEVICE

CROSS-REFERENCE TO RELATED APPLICATION

This application claims priority and benefit of provisional application Ser. No. 62/262,661 filed on Dec. 2, 2015 which is hereby incorporated by reference in its entirety.

FIELD OF THE INVENTION

This invention relates to the protection system for battery conductors, also known as battery electrode collectors in lithium-ion batteries, in cameras mounted on a gun, bow, or shooting device. More particularly, the present invention relates to the system of protecting the conductors in a battery from fracture in a camera attached to a gun barrel or shooting device as a result of recoil, shock, and vibration.

BACKGROUND OF THE INVENTION

Batteries are used in cameras attached to shooting devices to provide power for the camera. The batteries can be rechargeable or disposable. Rechargeable batteries are often chosen for their characteristics. The most commonly used rechargeable batteries used in consumer electronics are lithium-ion batteries (LIBs). They are one of the most popular types of rechargeable batteries for portable electronics. LIBS are desirable for their high energy density, low memory effect, and slow discharge when not in use. Beyond consumer electronics, LIBs are also growing in popularity for military, electric vehicle and aerospace applications.

SUMMARY OF THE INVENTION

This invention will allow battery conductors to survive repeated vibration and shock from gun discharges. The physical dimensions of a rechargeable cell can vary depending on the temperature of the cell and also on the electrical charge level of the cell. The charge level of the cell is referred to as the state-of-charge (SOC) and is a measure of how much of the cells available mAh capacity remains. This invention allows for the expansion and contraction of the electrode materials when SOC level changes. Also this invention allows for expansion and contraction due to thermal changes.

This present invention has specific application in the hunting, target shooting, and law enforcement fields. The primary example used in the figures and description will be the case in which a battery cell provides power for a camera attached to a gun.

Accordingly, the present invention is directed, in part, to a system and method for the mounting of a battery cell to prevent the mass of the materials used in the cell from fracturing the conductors that connect the active electrode materials to the electrical circuit required to supply power to the camera device.

The present invention uses the collector protector device to keep the active electrode materials against the cell wall of the container (pouch) and reduce the stresses on the current collectors when shock and vibration, including gun recoil, generates forces that would stress the current collectors in the area between the electrode materials and the positive and negative leads providing power to the camera device.

DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The present invention is generally directed to the system of preventing the active electrode material in a cell from moving within the cell pouch in a manner that would stress and potentially break the current collectors during shock and vibration, including gun recoil. In particular the end of the cell pouch that the active material will move towards during recoil is referred to as the cell wall and the objective is to have minimal space between the active material and the cell wall. Any space, referred to as the problematic gap, results in stress on the current collectors from movement during recoil or shock. Minimizing the problematic gap is an objective of the invention.

This invention is not directed at maintaining electrical contact in removable batteries such as the contact springs in AA battery type applications or spring loaded contact pins (pogo pins) such as those used to maintain electrical contact in cell phone battery applications.

Some advantages of the methods of the present invention include, in certain embodiments, the ability to have an optional pad placed between the pouch and the collector protector. The end of the roll of active material inside the pouch may not be flat. The optional pad can act as a shock absorber and can also act as a material to better contour the uneven roll end, to the cell wall, and in turn to the collector protector device.

Non-Limiting Definitions

The terms "a" or "an" are defined as one or more than one.

The term "against" includes all types of contact and implies minimal gap between surfaces. Any induced gap from external forces such as gun recoil should be considered temporary and small relative to the cell dimensions.

The term "another" is defined as at least a second or more.

The term "battery" is an electrochemical storage system. International industry standards differentiate between a "cell" and a "battery". A "cell" is a basic electrochemical unit that contains the basic components, such as electrodes, separator, electrolyte, and current collectors. A "battery" or "battery pack" is a collection of cells or cell assemblies which are ready for use, as it contains an appropriate housing, electrical interconnections, and possibly electronics to control and protect the cells from failure. In this regard, the simplest "battery" is a single cell with perhaps a small electronic circuit for over current protection.

The term "cell" includes all types of battery cells, both rechargeable and non-rechargeable.

As term "collector protector" comprises the device which maintains the active electrode material against the cell wall.

The term "coupled" is defined as connected, although not necessarily directly.

The term "current collectors" is used primarily with lithium-ion batteries. Metallic foils are used in lithium-ion batteries as current collectors and during the battery manufacturing process, anode and cathode slurries are coated on to the respective foil types. Stated differently, in lithium-ion batteries the active material forms the anode and cathode so those terms generally not used for the metal conductors or battery tabs. The current collector is a metal strip that is connected to the anode (positive electrode) or cathode (negative electrode).

The terms "including" and/or "having" are defined as comprising (i.e., open language).

The term "module" is often used as an intermediate topology, with the understanding that a battery pack is made of modules, and modules are composed of individual cells.

The term "plurality", is defined as two or more than two.

The term "shooting device" is any weapon that propels projectiles, including firearms, pistols, rifles, as well as bow and arrows and crossbows.

Long Gun with Barrel Mounted Camera

Figure 1:
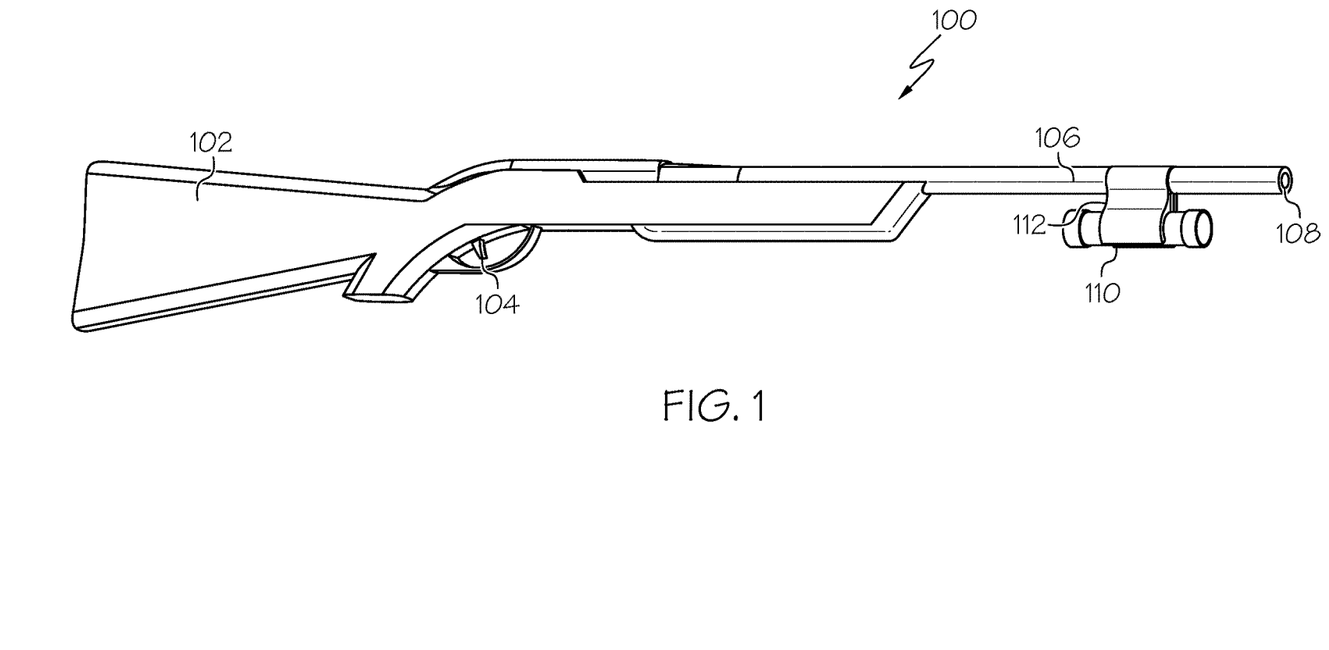
FIG. 1 is an example of a camera mounted to a barrel of a camera on a long gun.

Turning now to FIG. 1, shown is an example long gun 100. A few common parts of the long gun 100 are a stock 102, a trigger 104, a barrel 106, a discharge end 108.

A camera 110 with mounting hardware 112 is mechanically fastened to the barrel 106.

During discharge of the long gun 100, the camera 110 is subjected to recoil, shock and vibration. This causes premature failure of the components of the battery in the camera.

Camera Device

Figure 2:
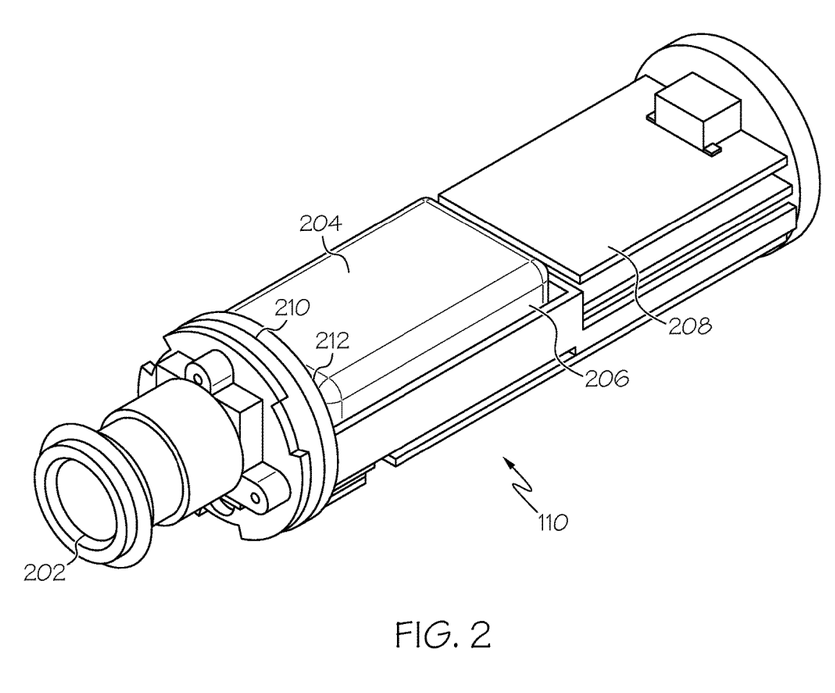
FIG. 2 is an example perspective view of the camera of FIG. 1 illustrating the internal assembly with a battery compartment containing one or more cells wrapped with a conductor protector device.

FIG. 2 is an example perspective view of the camera 110 of FIG. 1 illustrating the internal assembly 200. Shown is lens 202 and electronic assembly 208. A battery 204 is shown in battery compartment 206. The battery compartment wall 210 defines a gap 212 with battery 204. Any physical space (problematic gap) in this gap 212 between the battery compartment wall 210 and the active electrode material inside the battery 204 allows the active electrode material inside one or more cells of the battery 204 to move towards the battery compartment wall 210 during shock or recoil.

Figure 3:
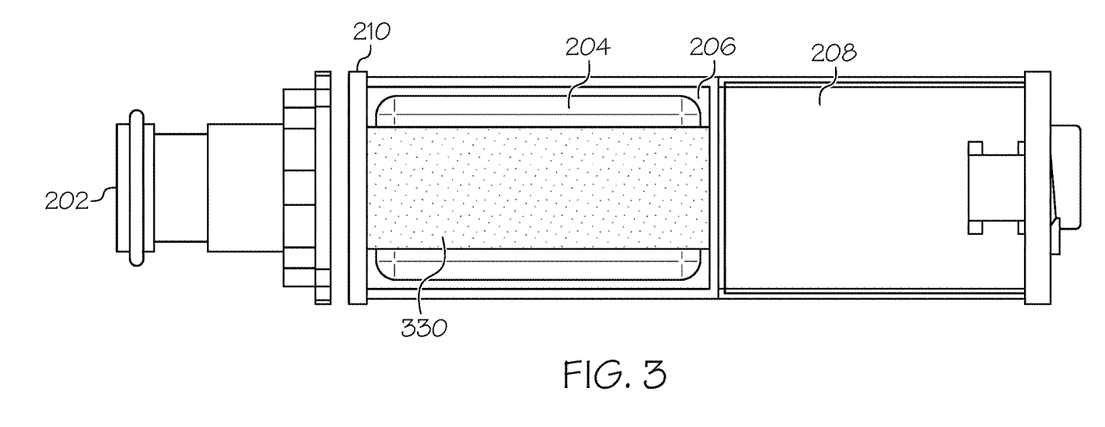
FIG. 3 is a top view the camera of FIG. 2 assembly with a battery compartment containing a battery wrapped with a conductor protector device.

FIG. 3 is a top view the camera 110 of FIG. 2 assembly with a battery compartment 206 containing the battery 204 with a conductor protector device 330. The collector protector device 330 is used to eliminate or reduce any problematic gap 212 between the battery compartment wall 210 and the battery 204.

Figure 4:
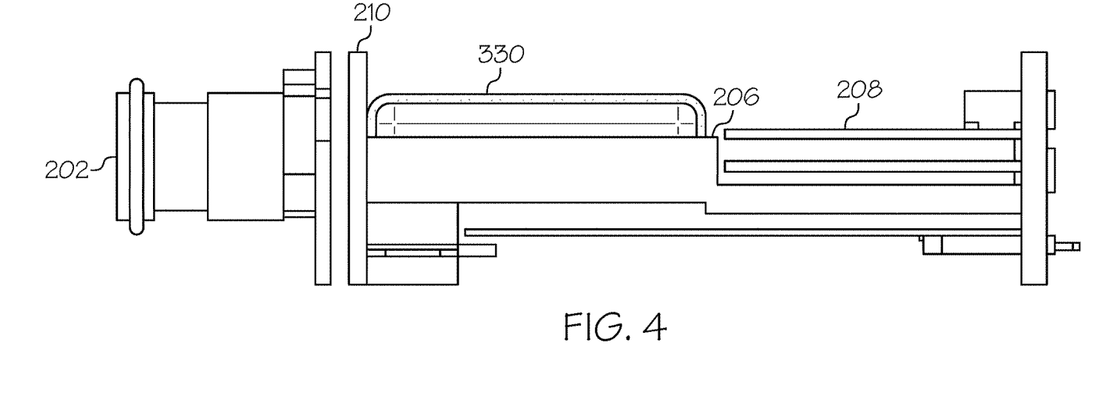
FIG. 4 is a side view the camera of FIG. 3.

FIG. 4 is a side view the camera of FIG. 3 illustrating the conductor protector device 330.

First Example of Battery Pouch with Conductor Protector Device

Figure 5:
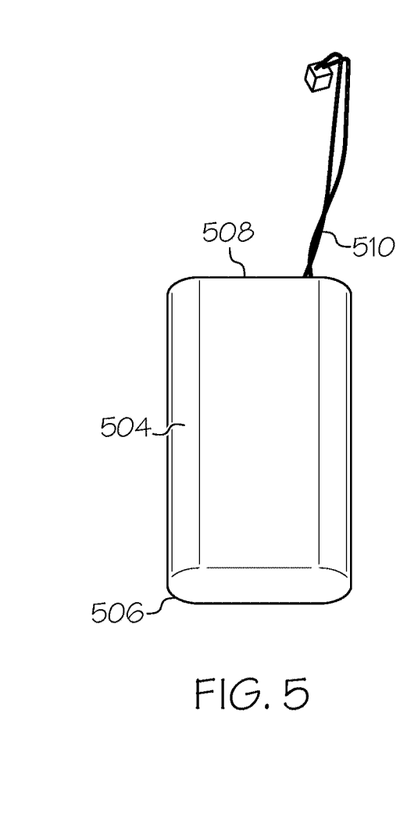
FIG. 5 is a battery in form of a battery pouch.

FIG. 5 is a battery 504. In this example, a lithium-ion battery in the form of a battery pouch 504 is shown. The battery pouch 504 has a first end 506, typically placed towards the discharge end 108 of the shooting device 102 of FIG. 1. It is this first end 506 that the internal active material inside the cells of the battery will move during recoil. A second end 508 of the battery pouch 504 is shown. In this example, an over-current protection circuit with a set of wire 510 is shown. The wires 510 are connected to the camera.

Figure 6:
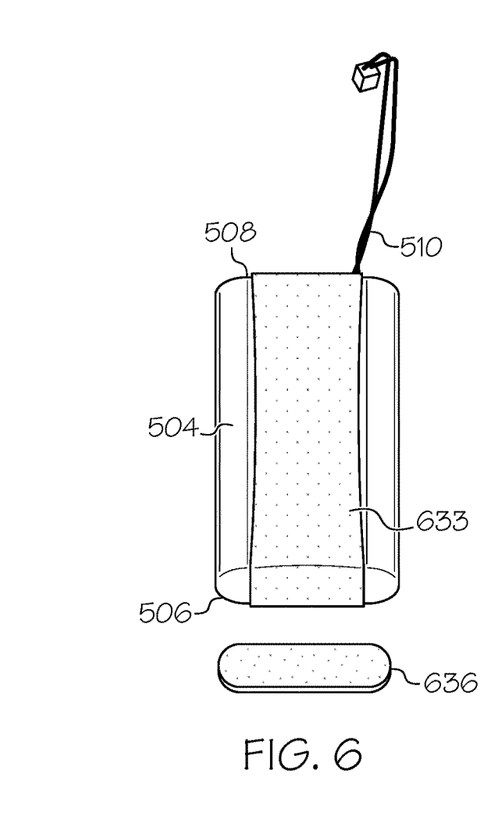
FIG. 6 shows the battery pouch of FIG. 5 with a first example of a collector protector device.

FIG. 6 shows the battery pouch 504 of FIG. 5 with a first example of a collector protector device. The collector protector device 633 is formed as a substantially oval shape around four sides of the battery pouch 504. The collector protector device 633 is rubber or other elastomer with elasticity. In another example, the collector protector device 633 is non-elasticized and used to reduce or minimize the gap 212 between the battery 204 and battery compartment wall 210 of FIG. 2.

Figure 7:
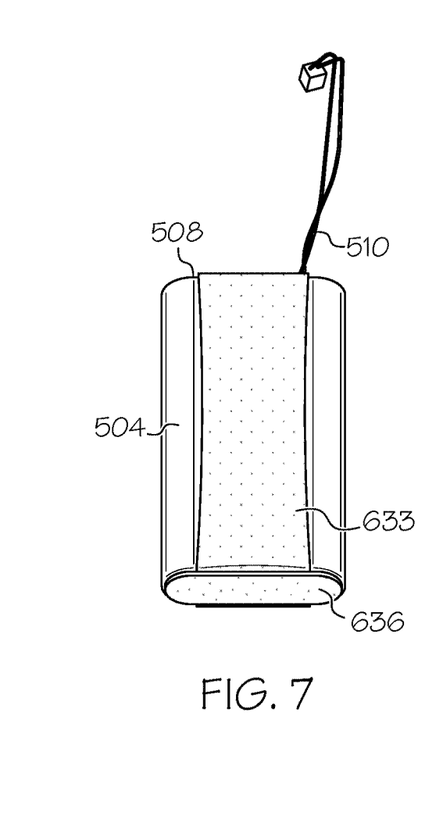
FIG. 7 shows the battery pouch of FIG. 6 with an optional pad.

FIG. 7 shows the battery pouch 504 of FIG. 6 with an optional pad 636 on the first end of the battery pouch 504. The cells (not shown) of the battery pouch 504 include active electrode material being maintained against a wall of the battery pouch 504, which is maintained against the optional pad 636, which in turn is maintained against the collector protector 633, which is mounted against the battery compartment wall 210 of FIG. 2.

Figure 8:
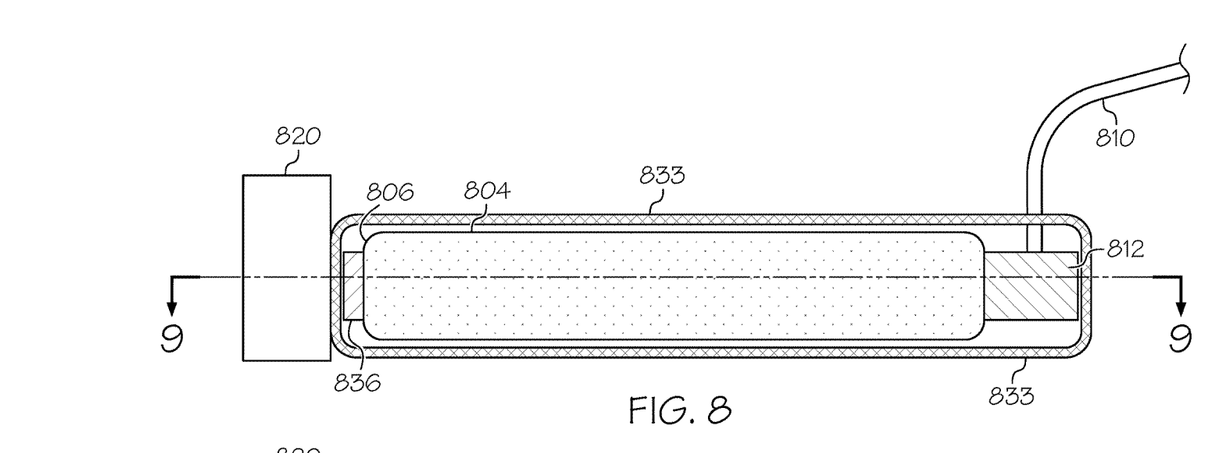
FIG. 8 is a first sectional view of the cell protector device of FIG. 6 illustrating the battery cell with the collector protector formed as a substantially oval shape on four sides of the battery cell along with an optional pad in the battery compartment.

FIG. 8 is a first sectional view of the battery pouch 804 similar to the battery pouch 504 of FIG. 6. Shown is the battery pouch 804 with the collector protector 833 in the battery compartment. The battery pouch 804 includes one or more cells (not shown) inside a battery pouch 804. Shown is an over-current prevention circuit 812 with battery leads 810 to connect to the camera.

Figure 9:
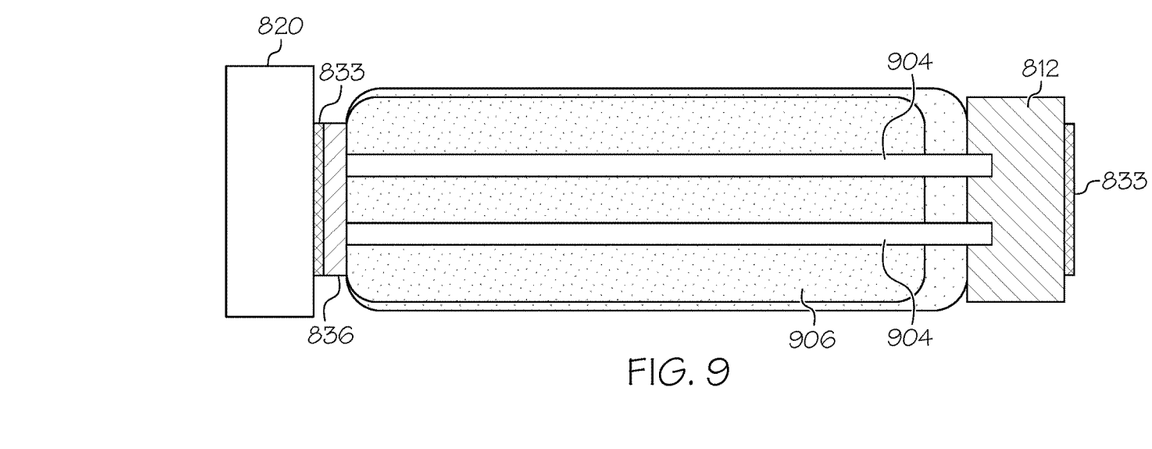
FIG. 9 is a second sectional view of FIG. 8.

FIG. 9 is a second sectional view along a battery's longitudinal axis of FIG. 8 that illustrated the current collectors 904 embedded within the cells (not shown) of the battery pouch 804 that includes active electrode material being 906. The active electrode material 906 and current collectors 904 are maintained against a wall of the battery pouch 804, which is maintained against the optional pad 836, which in turn is maintained against the collector protector 833, which is mounted against the battery compartment wall 820.

Unlike other prior art cushioning material this invention is not directed at maintaining electrical contact with the camera. Rather Electrode materials with problematic gap minimized by use of current collector protector device.

Second Example of Battery Pouch with Conductor Protector Device

Figure 10:
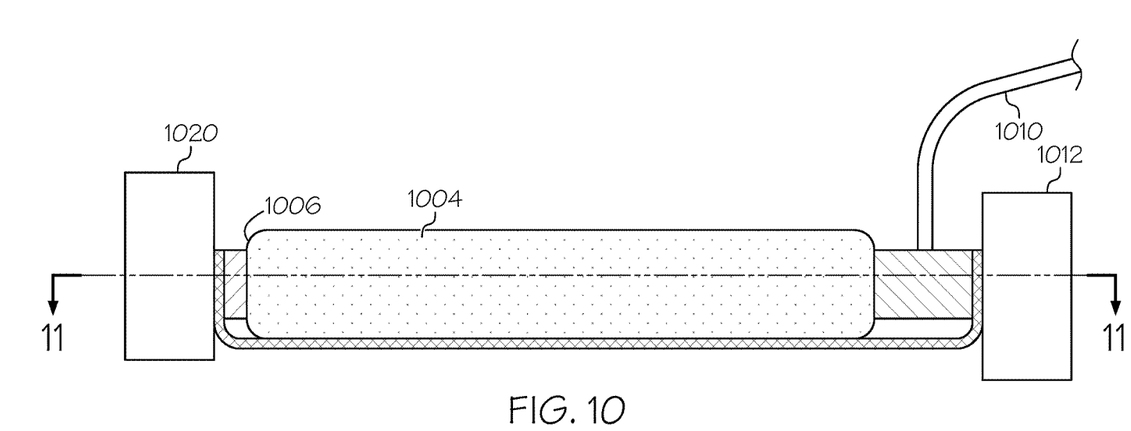
FIG. 10 is a battery cell with a second example of a collector protector device formed as a substantially u-shape on three sides of the battery cell along with an optional pad in the battery compartment.

FIG. 10 shows the battery pouch 1004 similar to the battery pouch 504 of FIG. 6. Shown is the battery pouch 1004 with a second example of a collector protector device 1033 in a battery compartment. The collector protector device is formed as a substantially u-shape (or clip) on three sides of the battery pouch 1004. The collector protector device 1033 is rubber or other elastomer with elasticity. In another example, the collector protector device 1033 is non-elasticized and used to reduce or minimize the gap 212 between the battery 204 and battery compartment wall 210 of FIG. 2.

Figure 11:
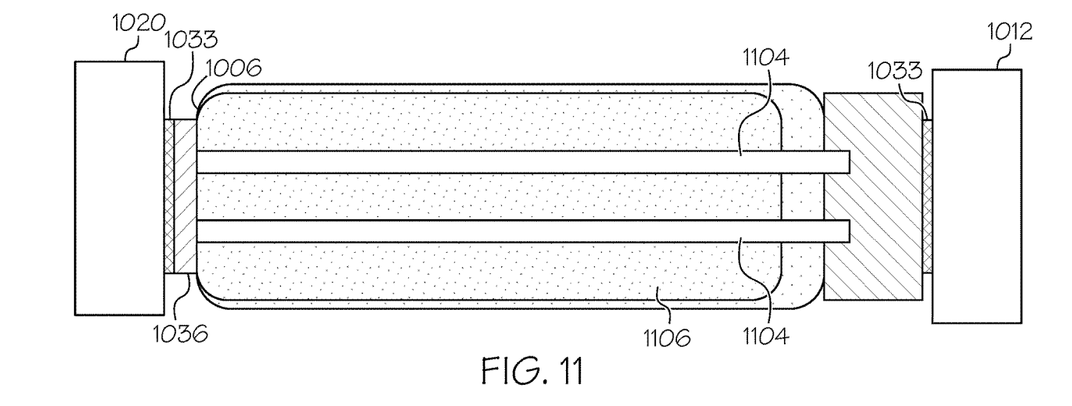
FIG. 11 is a second sectional view of FIG. 10.

FIG. 11 is a second sectional view along a battery's longitudinal axis of FIG. 10 that illustrates the current collectors 1104 embedded within the cells (not shown) of the battery pouch 1004 that includes active electrode material 1106. The active electrode material 1106 and current collectors 1104 are maintained against a wall of the battery pouch 1004. Shown is an optional pad 1036 on the first end of the battery pouch 1004.

The cells (not shown) of the battery pouch 1004 include active electrode material 1106 and current collectors 1104 being maintained against a wall 1006 of the battery pouch 1004, which is maintained against the optional pad 1036, which in turn is maintained against the collector protector 1033, which is mounted against the battery compartment wall 1020.

Third Example of Battery Pouch with Conductor Protector Device

Figure 12:
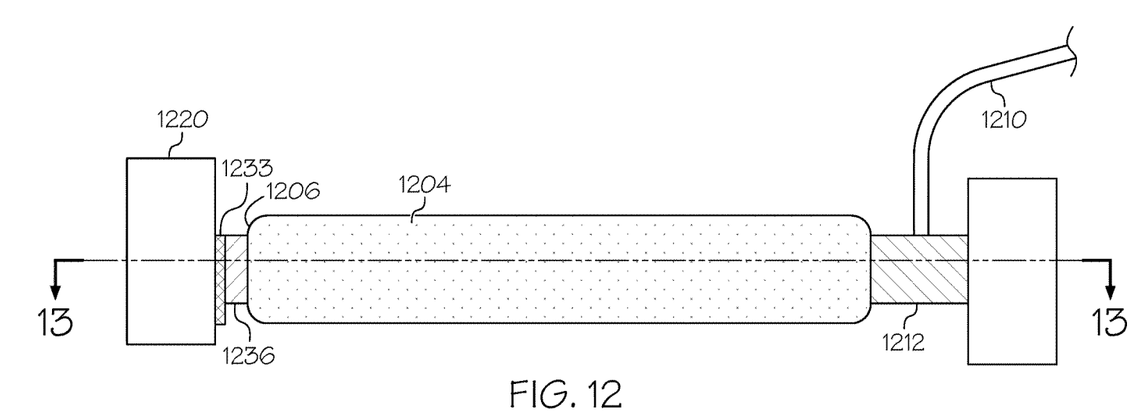
FIG. 12 is a battery cell with a third example of a collector protector device formed on one end of the battery cell along with an optional pad in the battery compartment.

FIG. 12 is a first sectional view of the battery pouch 1204 similar to the battery pouch 504 of FIG. 6. Shown is the battery pouch 1204 with a third example of the collector protector 1233 in a battery compartment. The battery pouch 1204 includes one or more cells (not shown) inside the battery pouch 1204. Shown is an over-current prevention circuit 1212 with battery leads 1210 to connect to the camera. The collector protector device is formed as a substantially oval shape on one side 1206 of the battery pouch 1204. The collector protector device is rubber or other elastomer with elasticity. In another example, the collector protector device is non-elasticized and used to reduce or minimize the gap 212 between the battery 204 and battery compartment wall 210 of FIG. 2.

Figure 13:
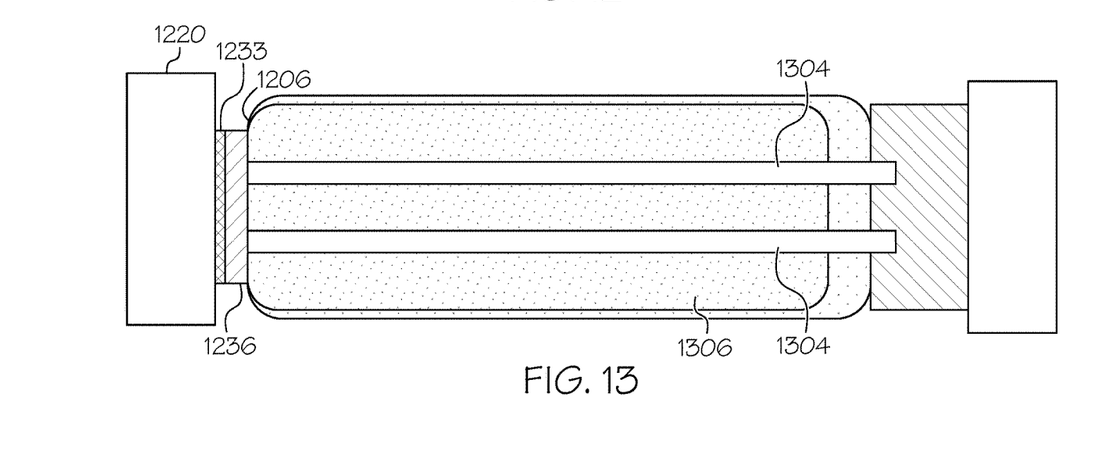
FIG. 13 is a second sectional view of FIG. 12.

FIG. 13 is a second sectional view along a battery's longitudinal axis of FIG. 12 that illustrates the current collectors 1304 embedded within the cells (not shown) of the battery pouch 1204 that includes active electrode material 1306. The active electrode material 1306 and current collectors 1304 are maintained against a wall of the battery pouch 1204. Shown is an optional pad 1236 on the first end of the battery pouch 1204.

The cells (not shown) of the battery pouch 1204 include active electrode material 1306 and current collectors 1304 being maintained against a wall 1206 of the battery pouch 1204, which is maintained against the optional pad 1236, which in turn is maintained against the collector protector 1233, which is mounted against the battery compartment wall 1220.

Anatomy of Lithium-Ion Battery

Figure 14:
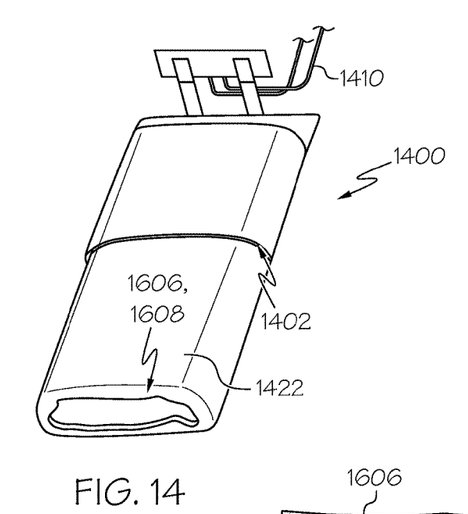
FIG. 14, FIG. 15, and FIG. 16 illustrates components typically found in a battery cell.
Figure 15:
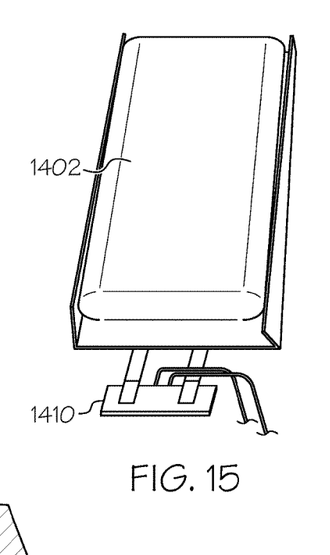
Figure 16:
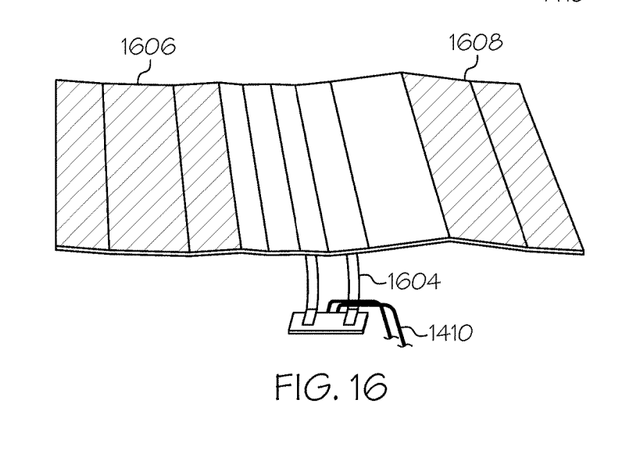

FIG. 14, FIG. 15 and FIG. 16 illustrate components typically found in a lithium-ion battery 1400. Shown is a battery pouch 1402 with foil wrapper 1422. The four primary functional components of a lithium-ion battery are the positive and negative electrodes, electrolyte, and the current collectors 1604. Generally, the negative electrode of a conventional lithium-ion cell is made from carbon 1606. The positive electrode is a metal oxide 1608, and the electrolyte is a lithium salt in an organic solvent. The current collectors 1604 are usually made of metal alloys, aluminum, or some relatively inexpensive metals.

At the point the current collectors exit the cell or are connected to an electrical circuit they are often referred to as the terminals 1410.

Li-ion cells (as distinct from entire batteries) are available in various shapes, which can generally be divided into four groups:

Small cylindrical (solid body without terminals, such as those used in laptop batteries)

Large cylindrical (solid body with large threaded terminals)

Pouch (soft, flat body, such as those used in cell phones and cameras). This invention most directly relates to the pouch type cells which are the cells of choice in the application where a camera is attached to a source of shock and vibration such as recoil from a gun.

Prismatic (semi-hard plastic case with large threaded terminals, such as vehicles' traction packs)

Accordingly, in one embodiment, the present invention is cell hardware comprising:

(a) a collector protector device that maintains the active electrode material against the cell wall during shock and vibration; and (b) the collector protector device material is selected to control the force with which the active electrode material is held against the cell wall; and (c) the collector protector device material is selected to allow for expansion of the electrode materials when their state-of-charge (SOC) level is high, and expansion and contraction from thermal changes.

In some preferred embodiments, an optional pad placed between the cell wall and the collector protector can act as a shock absorber.

In some preferred embodiments, an optional pad placed between the cell wall and the collector protector can act as a material to better contour to the cell wall and the shape of the active electrode material internal to the cell.

Non-Limiting Examples

It is believed the names used herein correctly and accurately reflect the underlying components, and process equipment. However, the nature and value of the present invention does not depend upon the theoretical correctness of these, in whole or in part. Thus it is understood that the names attributed to the correspondingly indicated components, and process equipment are not intended to limit the invention in any way.

When ranges are used herein for physical properties, such as force or distance, all combinations and sub combinations of ranges and specific embodiments therein are intended to be included.

The diagrams depicted herein are just one example. There can be many variations to this diagram or the steps (or operations) described therein without departing from the spirit of the invention. For instance, the steps can be performed in a differing order or steps can be added, deleted or modified. All of these variations are considered a part of the claimed invention.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed:

1. A protection system for camera system comprising:
   a camera with a lens and a mount to mechanically couple with a weapon that propels projectiles from a discharge end along a longitudinal axis from the weapon;
   a battery compartment formed as part of the camera system;
   a battery with internal components including active electrode material formed within one or more cells surrounded with at least one cell wall defining a soft pouch cell-type for insertion into the battery compartment in which a gap is formed between the cell wall and an end wall of the battery compartment closest to the lens along a battery's longitudinal axis which is parallel to the longitudinal axis of the weapon; and
   a piece of material forming a collector protector device which is formed as a substantially U-shape surrounding three sides of the soft pouch cell-type that is separate from the battery and separate from the battery compartment formed to fill the gap in order to hold the active electrode materials against the soft pouch cell-type thereby reducing any stress on current collector components which are disposed inside the soft pouch cell-type of the battery during shock and vibration in a direction along the battery's longitudinal axis, and the piece of material selected to allow for expansion and contraction of the active electrode materials due to thermal changes or state-of-charge level changes, and the collector protector device formed to fill the gap to hold the active electrode materials against the soft pouch cell-type, which is independent of any other cushioning material used to maintain an electrical contact, via contact springs or spring loaded.

2. The protection system according to claim 1, wherein the piece of material is substantially oval shape surrounding four sides of the battery.

3. The protection system according to claim 1, further comprising:
   a pad disposed between the cell wall and the piece of material forming the collector protector device to function as a shock absorber.

4. The protection system according to claim 2, wherein the piece of material is a rigid material.

5. The protection system according to claim 3, wherein the pad is placed between the cell wall and the collector protector device fills in a contour to the cell wall and the end wall of the battery compartment.

6. The protection system according to claim 3, wherein the pad is made from material selected to allow for expansion and contraction of the active electrode materials due to state-of-charge level changes.

7. The protection system according to claim 3, wherein the pad is made from material selected to allow for expansion and contraction of the active electrode materials due to thermal changes.

8. The protection system according to claim 3, wherein the pad is an elastic material.

9. The protection system according to claim 3, wherein the pad is a rigid material.

10. A protection system for camera system comprising:
    a camera with a lens and a mount to mechanically couple with a weapon that propels projectiles from a discharge end along a longitudinal axis from the weapon;
    a battery compartment formed as part of the camera system with a first end along a direction of the discharge end of the weapon and a second end in an opposite direction from the discharge end of the weapon;
    a battery with internal components including battery leads and active electrode materials formed within one or more cells surrounded with at least one cell wall defining a soft pouch cell-type for insertion into the battery compartment in which a gap is formed between the cell wall at an opposite end to the battery leads and an end wall of the battery compartment closest to the lens adjacent to the first end of the battery compartment along a battery's longitudinal axis which is parallel to the longitudinal axis of the weapon; and
    a piece of material forming a collector protector device which is formed as a substantially U-shape surrounding three sides of the soft pouch cell-type that is separate from the battery and separate from the battery compartment formed to fill the gap in order to hold the active electrode materials against the soft pouch cell-type at the opposite end to the battery leads thereby reducing any stress on current collector components which are disposed inside the soft pouch cell-type of the battery during shock and vibration in a direction along the battery's longitudinal axis, and the piece of material selected to allow for expansion and contraction of the active electrode materials due to thermal changes or state-of-charge level changes, and the collector protector device formed to fill the gap to hold the active electrode materials against the soft pouch cell-type, which is independent of any other cushioning material used to maintain an electrical contact, via contact springs or spring loaded.

11. The protection system according to claim 10, wherein the piece of material is substantially oval shape surrounding four sides of the battery.

12. The protection system according to claim 10, further comprising:
    a pad disposed between the cell wall and the piece of material forming the collector protector device to function as a shock absorber.

13. The protection system according to claim 11, wherein the piece of material is a rigid material.

14. The protection system according to claim 12, wherein the pad is placed between the cell wall and the collector protector device fills in a contour to the cell wall and the end wall of the battery compartment.

15. The protection system according to claim 12, wherein the pad is made from material selected to allow for expansion and contraction of the active electrode materials due to state-of-charge level changes.

16. The protection system according to claim 12, wherein the pad is made from material selected to allow for expansion and contraction of the active electrode materials due to thermal changes.

17. The protection system according to claim 12, wherein the pad is an elastic material.

18. The protection system according to claim 12, wherein the pad is a rigid material.

* * * * *